United States Patent [19]

Boyesen

[11] Patent Number: 4,474,145
[45] Date of Patent: Oct. 2, 1984

[54] FUEL SUPPLY SYSTEM FOR INTERNAL COMBUSTION ENGINE

[75] Inventor: Eyvind Boyesen, Kempton, Pa.

[73] Assignee: Performance Industries, Inc., Kempton, Pa.

[21] Appl. No.: 521,844

[22] Filed: Aug. 10, 1983

[51] Int. Cl.³ ............................................. F02B 33/04
[52] U.S. Cl. ............................. 123/73 PP; 123/73 V; 123/73 R; 123/73 A; 123/52 MF; 123/65 PD; 137/512.1; 137/852
[58] Field of Search ............... 123/73 A, 73 R, 73 V, 123/73 AA, 73 PP, 65 PD, 433, 81 R, 188 R, 52 MF; 137/512.1, 512.15, 525.5, 525.3

[56] References Cited

U.S. PATENT DOCUMENTS

| 3,859,968 | 1/1975 | Stinebaugh | 123/73 V |
| 4,228,770 | 10/1980 | Boyesen | 123/73 V |
| 4,389,982 | 6/1983 | Boyesen | 123/73 R |

Primary Examiner—Wendell E. Burns
Attorney, Agent, or Firm—John T. Synnestvedt; Kenneth P. Synnestvedt

[57] ABSTRACT

A two-cycle internal combustion engine having reed valves in the fuel/air supply system is provided with an element in the flow path of the fuel/air into the reed valves, which element is shaped and positioned to promote uniformity of flow of the fuel/air mixture in the flow passage.

22 Claims, 15 Drawing Figures

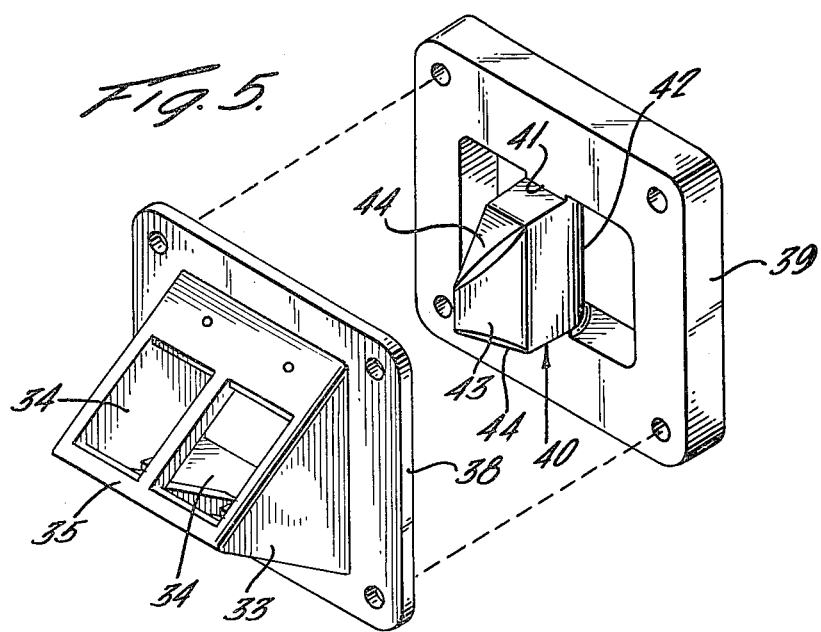
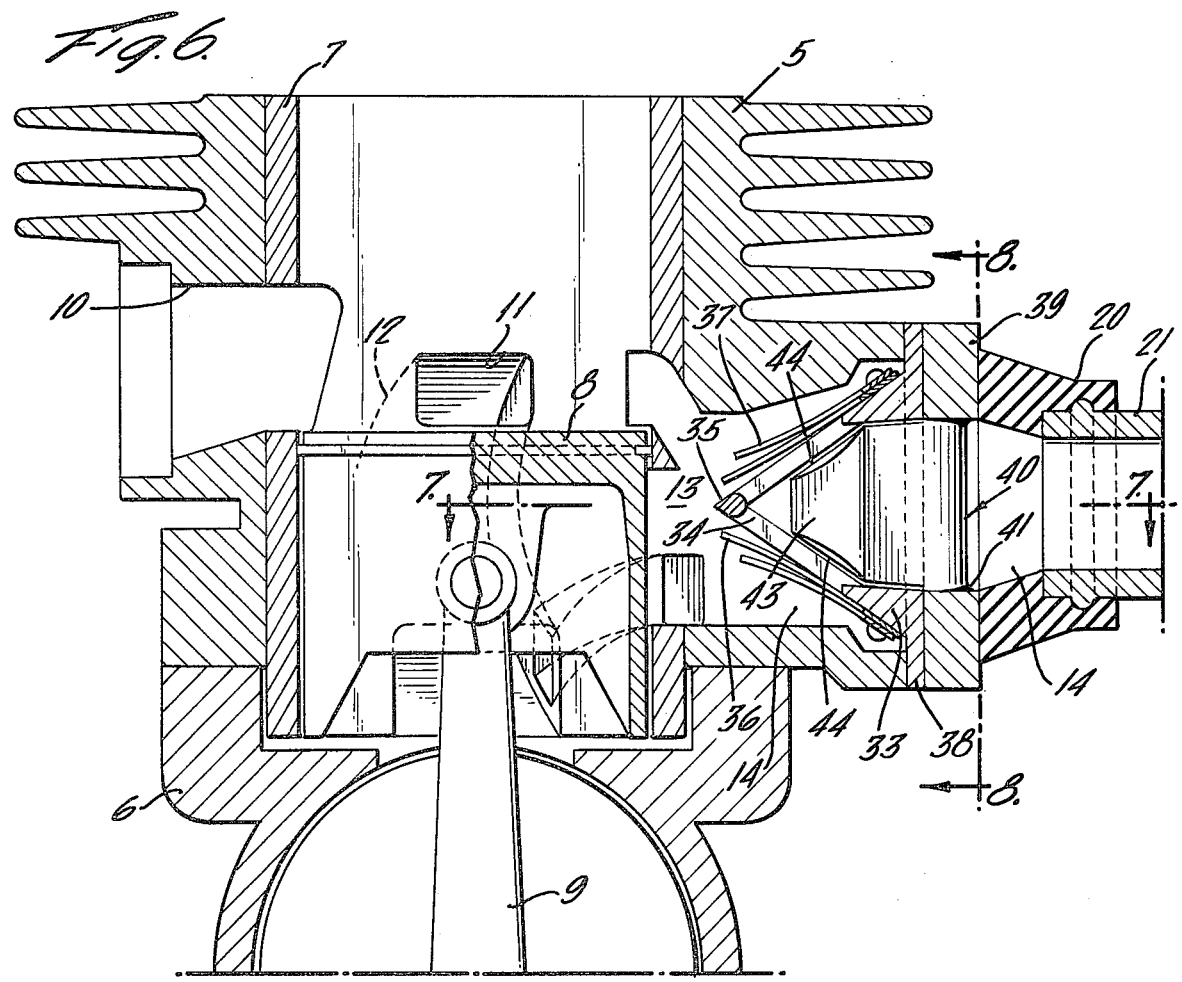

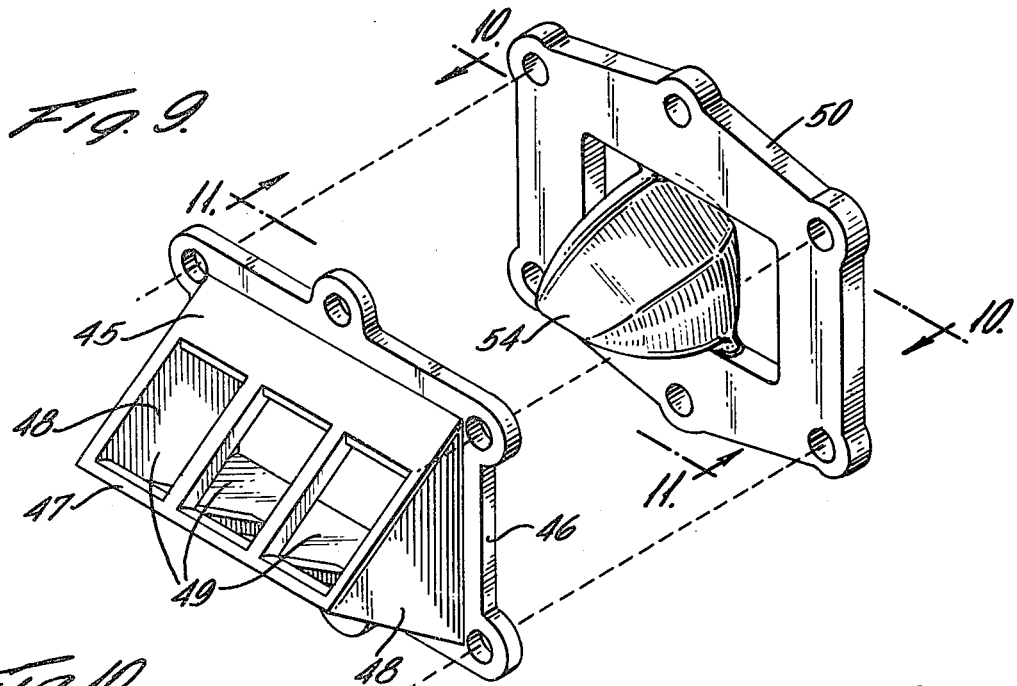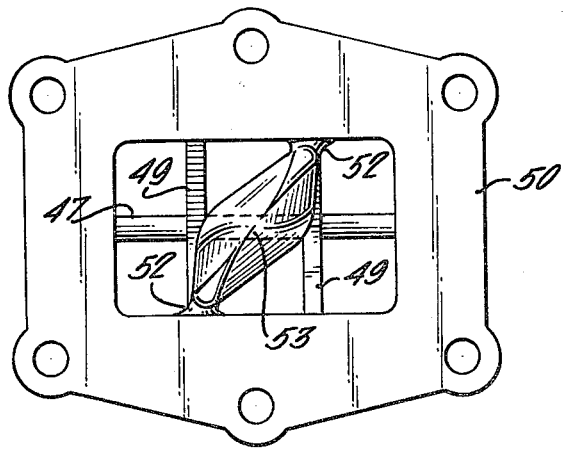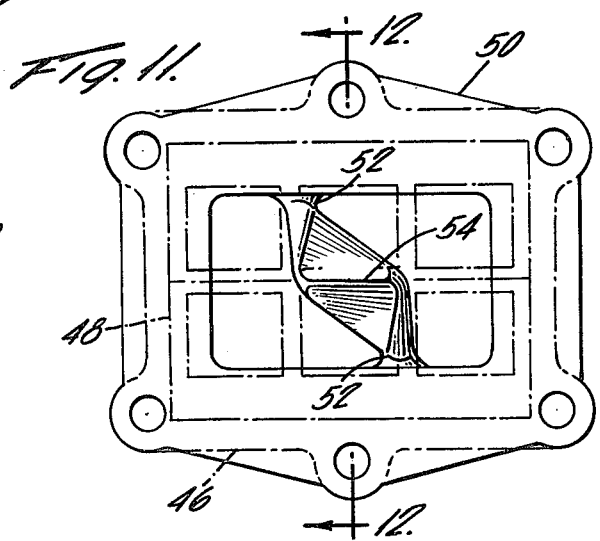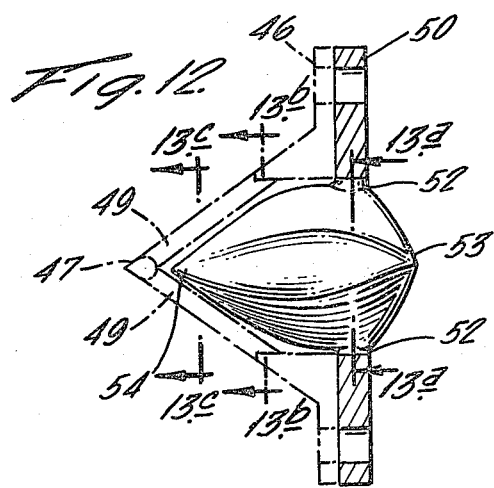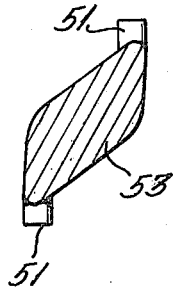

FUEL SUPPLY SYSTEM FOR INTERNAL COMBUSTION ENGINE

BACKGROUND AND STATEMENT OF OBJECTS

This invention relates to a fuel supply system for an internal combustion engine, and the invention is especially adapted for use with two-cycle engines having a plurality of reed valves, particularly where those valves are associated with a V-shaped reed valve cage. In arrangements of this type, various factors tend to cause irregularities in the flow of the fuel/air mixture. Thus, the flow tends to increase in the central region of the flow passage and tends to decrease adjacent to the boundaries of the passage. Moreover, in arrangements of this type, and especially where a V-shaped valve cage is used, the cross-sectional area of the fuel/air flow passage in regions upstream of the reed valves varies at different distances upstream of the valve cage and also in the immediate vicinity of the reed valves themselves mounted on the V-shaped reed valve cage.

Because of these variations in the flow and for reasons explained more fully hereinafter, it is desirable to introduce into the flow path at least one element configured and positioned to divert the flow in different regions of the flow path, the dimension of the flow providing for reduction in the variations which tend to occur.

Because of tendency for the flow to become concentrated in the central region of the flow path, it is desirable to position a flow diverting element in the central region of the flow path, the element being shaped and positioned to divert or direct the flow away from the central region and toward the boundary walls of the flow path.

Also, because of the differences in cross-sectional dimension of the flow passage in various regions of the intake duct, the velocity of flow of the fuel/air mixture changes in different regions of the flow passage, the flow velocity being relatively low in regions of relatively large cross-sectional flow area and being relatively high in regions of relatively small cross-sectional flow area. Fluctuations in velocity are accompanied by energy loss because of changes in the dynamic inertia of the fuel/air mixture travelling through the intake duct. In turn, this results in a lower overall average velocity, with consequent reduction in the overall quantity of the fuel/air mixture being delivered through the system and into the engine.

According to the present invention, this irregularity in velocity of flow may be reduced by employing a flow diverting element adapted to reduce the irregularity in velocity of flow.

My prior U.S. Pat. No. 4,228,770 discloses the use of a bar or element of aeroform shape in a flow passage upstream of the reed valves, the bar being positioned to reduce variation in cross-sectional flow area and the resultant fluctuations in flow velocity and thus in the dynamic or kinetic energy losses. The arrangements of the present application also accomplish this general purpose; but in addition, the arrangements of the present invention contemplate the use of a flow diverting element differently positioned and of different configuration as compared with the element disclosed in my prior patent. Thus, whereas in my prior patent the aeroform element is comprised of a bar of varying contour in only one plane, the element used in accordance with the present invention is of varying contour in two planes, preferably at right angles to each other.

In several embodiments of the elements disclosed in the present application, the element or elements of varying contour are of aeroform shape in either one or both of the two planes referred to above.

Still further, the arrangement of the present invention provides for positioning of the element so that the element diverts the flow from the central region toward the boundaries and especially toward the boundaries which are most remote from the central region. For example, the diverting element is desirably closely nested within the central region of the V-shaped reed valve cage commonly employed in association with the reed valves for the engine. Moreover, the present invention provides for the employment of an element of aeroform shape in which the aeroform contour is present not only in a plane containing the flow axis and the apex of the reed valve cage, as is the case in my prior patent, but also in a plane containing the flow axis and at right angles to the apex of the reed valve cage. Still further, the improved aeroform element employed in accordance with the present invention has an edge thereof lying in said plane perpendicular to the reed cage apex and proportioned so that that edge may be mounted within the V-shaped reed cage with the extremity of the edge portion lying closely adjacent to the interior wall of the reed cage. In this way, with reed cages having a plurality of laterally spaced valve ports, the edge of the aeroform element, when closely nested within the reed cage, effectively divides the interior of the reed cage into two portions respectively communicating with the valve ports lying at opposite sides of the aeroform element.

In accordance with another aspect of the invention, the element introduced into the flow channel is proportioned, configured and mounted in a manner which increases the volume of the element in the central region of the flow passage, and at the same time, decreases the volume of the element in the marginal regions adjoining the boundaries of the flow passage. By this arrangement, the flow is distributed more uniformly throughout the entire cross-sectional flow area of the flow passage. This is of particular importance in installations in which the overall cross-sectional flow area, for instance, in the region of the entrance into the V-shaped valve cage, is of generally rectangular shape with the dimension paralleling the axis of the reed cage apex considerably greater than the transverse dimension. Indeed, in reed cages having three or four valve ports at each side of the reed cage, the dimension paralleling the axis of the reed cage apex may even be as much as two times the dimension in the transverse direction. Without provision for increasing the uniformity of the fuel/air mixture, the tendency for the flow to concentrate in the central region results in reduction of flow through the outboard valve ports to such an extent as to impair the overall input of the fuel/air mixture, with consequent impairment of the engine power output, and this detrimental effect is present at any engine speed.

Having the foregoing in mind, the arrangements of the present invention, in contrast to the arrangement of my prior U.S. Pat. No. 4,228,770, provide for mounting devices, such as the mounting posts for the element introduced into the flow path of the intake passage, which mounting posts are not located in the regions most remotely spaced from the central zone of the flow passage, as in the prior patent above referred to, but which are located at the boundaries of the flow passage which are closest to the central flow region. By locating the mounting posts as just mentioned, increased flow is provided, particularly adjacent those boundaries of the flow passage which are most remote from the central region. This is of great importance, even if the element introduced into the flow passage is not proportioned to result in substantial equalization of the overall cross-sectional flow area in various zones upstream and downstream of the flow passage. Furthermore, this feature is desirably employed even if the element introduced into the flow passage is not of aeroform contour; but for various reasons, the aerofrom contour elements are, of course preferred because of the fact that the aeroform shape tends to minimize localized eddy currents which also tend to decrease the overall efficiency of feed of the fuel/air mixture.

Having the above in mind, the element mounted in the flow path in accordance with the present invention is preferably provided with mounting posts lying in a plane at right angles to the reed cage apex; and at opposite sides of that plane, the end portions of the element are terminated short of the reed cage end walls, thereby minimizing obstruction of the flow passage in the region toward the ends of the reed cage.

The foregoing and various other features of the invention provide extensive increase in fuel flow capacity, particularly because of the striking increase in uniformity of flow velocity and flow distribution. As a result, actual tests have shown that the arrangement of the invention greatly increases the fuel/air input capacity of the system, particularly at high engine speeds where maximum input of fuel/air is desired.

BRIEF DESCRIPTION OF THE DRAWINGS

How the foregoing and other objects and advantages are attained will appear more fully from the following description of the drawings, in which.

First Embodiment

Second Embodiment

Figure 1:
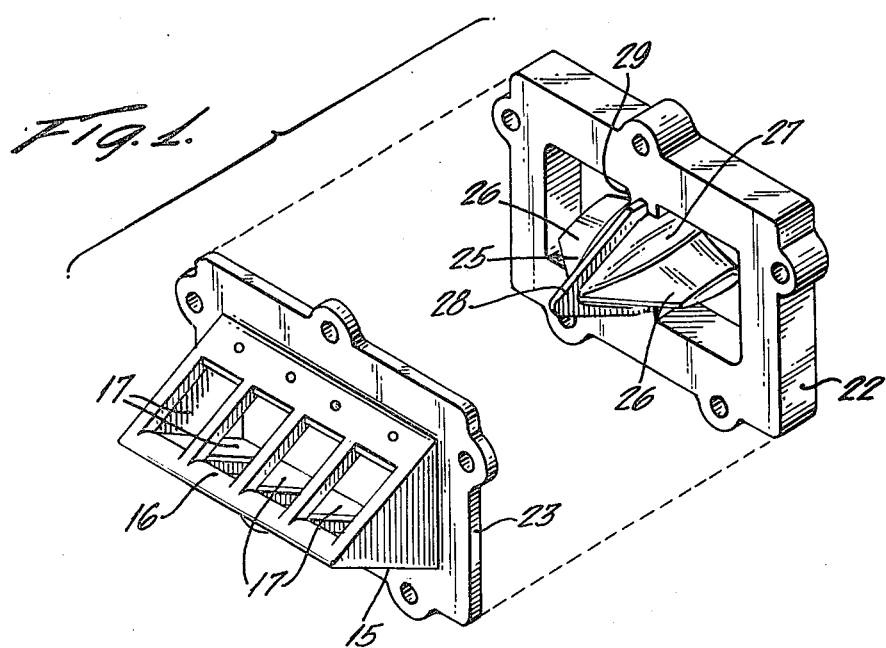
FIG. 1 is a perspective exploded view of one embodiment in which a multiple port reed valve cage and an aeroform element of the kind provided by the present invention is mounted in a frame adapted to be connected with the reed valve cage and other parts of the engine structure, this embodiment being particularly adapted for use with a V-shaped reed cage having four ports on each side.
Figure 2:
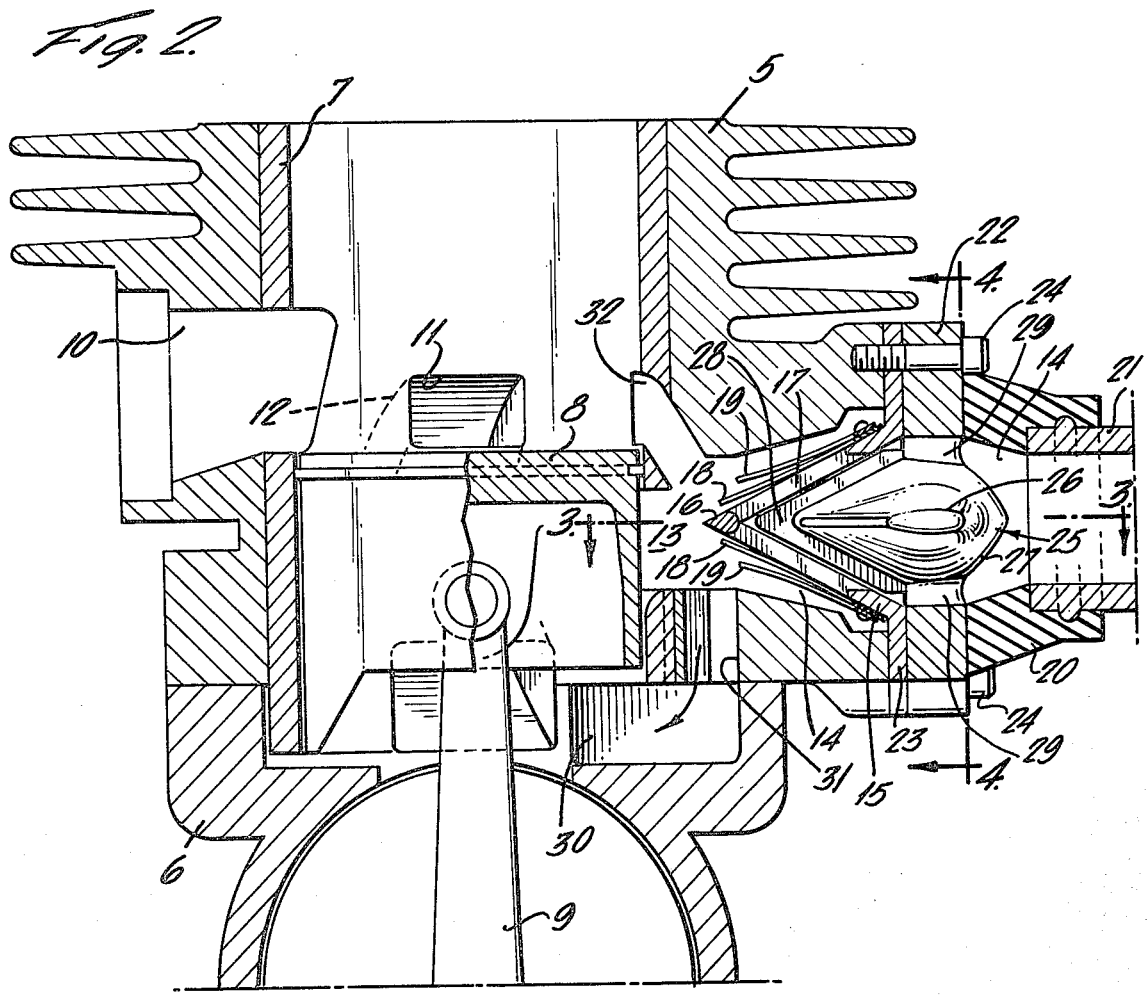
FIG. 2 is a vertical sectional view through a typical engine, embodying the arrangement of FIG. 1, certain parts being indicated only in outline.
Figure 3:
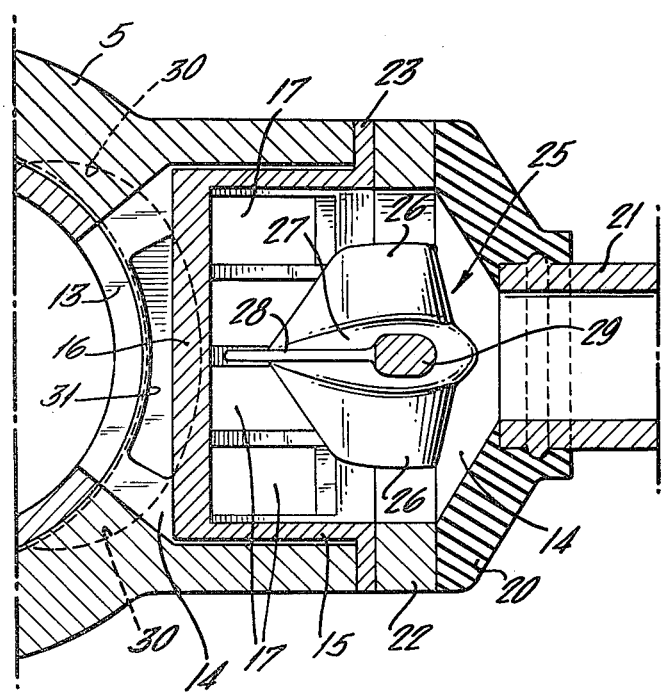
FIG. 3 is a horizontal sectional view taken as indicated by the line 3—3 on FIG. 2.
Figure 7:
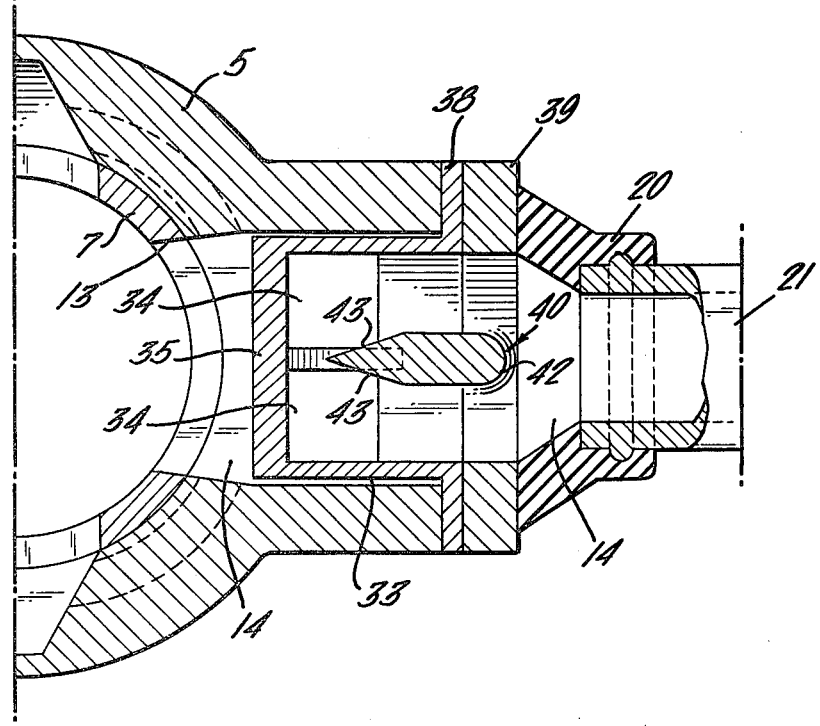
Figure 8:
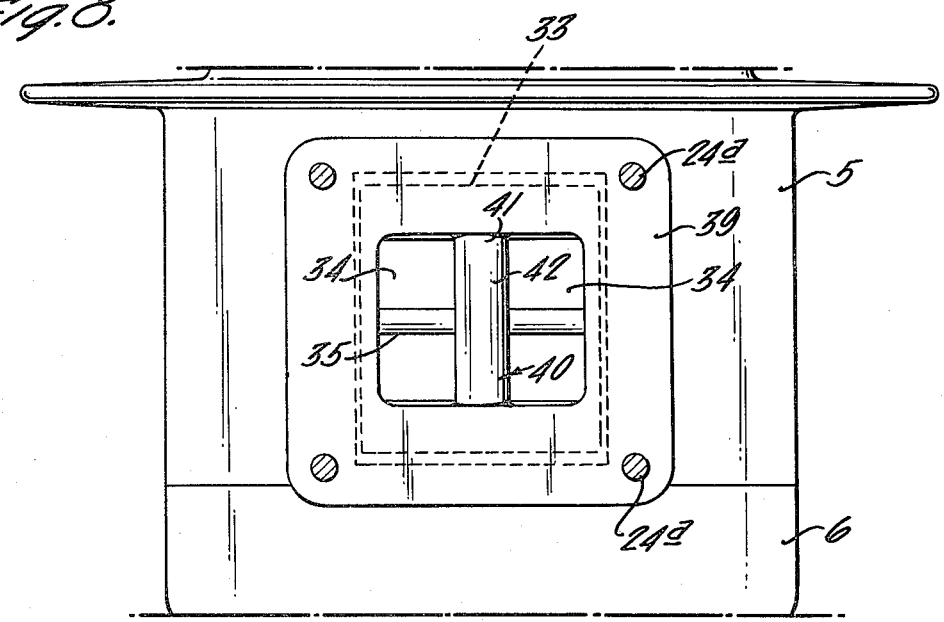

FIG. 5 is a view similar to FIG. 1 but illustrating certain components of a modified embodiment according to the present invention in which a single bar-shaped element is employed, having varying cross section in two planes, this embodiment being particularly adapted to use with a V-shaped reed cage having two ports on each side;

FIG. 6 is a view similar to FIG. 2 but illustrating an engine embodying the arrangement shown in FIG. 5;

FIG. 7 is a view similar to FIG. 3, this view being taken as indicated by the section line 7—7 on FIG. 6;

FIG. 8 is a vertical sectional view taken as indicated by the section line 8—8 on FIG. 6;

Third Embodiment

Figure 4:
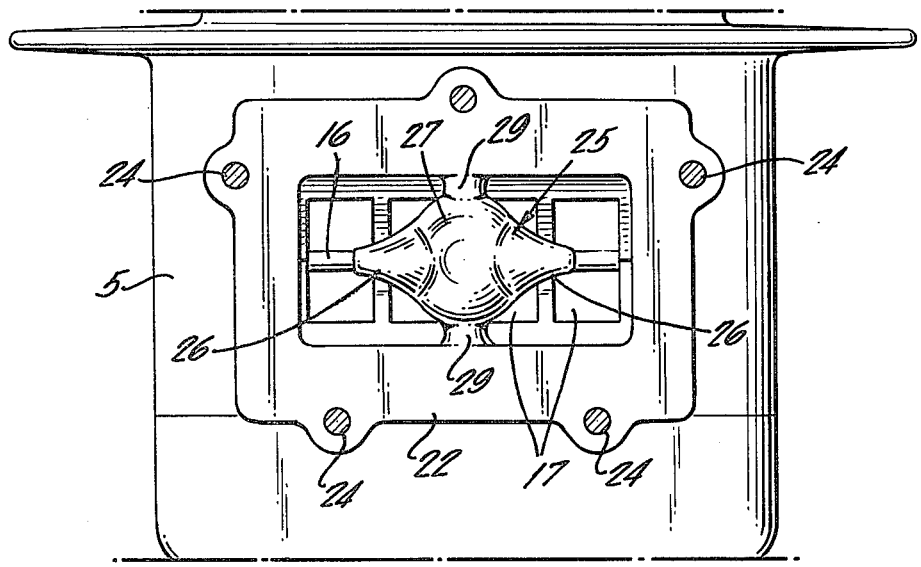
FIG. 4 is a view taken substantially as indicated by the line 4—4 on FIG. 2.

FIG. 9 is a view similar to FIG. 1 but illustrating certain components of a modified embodiment according to the present invention in which a specially configured flow diverting element is employed, being particularly adapted for use in a V-shaped valve reed cage having three ports on each side;

FIG. 10 is a view similar to FIG. 4 but illustrating the modified embodiment of FIG. 9, this view being taken as indicated by the line 10—10 applied to FIG. 9;

FIG. 11 is a view similar to FIG. 10 but taken in the direction indicated by the arrows 11—11 on FIG. 9;

FIG. 12 is a transverse sectional view taken as indicated by the section line 12—12 on FIG. 11; and FIGS. 13a, 13b and 13c are sectional views of the flow diverting element of the third embodiment, these views being taken as indicated by the section lines 13a—13a, 13b—13b and 13c—13c on FIG. 12.

DETAILED DESCRIPTION OF THE DRAWINGS

In FIGS. 1 to 4, illustrating the first embodiment, the engine shown comprises housing structure including the upper portion 5 and the lower portion 6. A cylinder liner 7 extends vertically through the engine housing structure and defines the cylinder space in which the piston 8 reciprocates vertically, the piston being connected by the rod 9 with the engine shaft (not shown) in the manner well understood in this art.

An exhaust port 10 is arranged in the cylinder wall just above the bottom dead center position of the piston 8, as appears at the left of FIG. 2. The fuel transfer port 11 is connected by the transfer passage 12 with the space below the piston.

Two-cycle engines of the kind to which the invention is particularly adapted are also customarily provided with at least one intake port, for instance, the intake port indicated at 13, this port being in communication with the intake passage 14 in which the reed valve cage 15 is arranged. The reed cage is of generally V-shaped cross section, having an apex member 16 presented downstream toward the intake port 13. The inclined reed cage side walls have a plurality of laterally spaced ports 17 over which primary reed valves 18 extend. In a manner preferably conforming with my prior U.S. Pat. No. 3,905,341, the primary reeds 18 are provided with additional ports over which the secondary reed valves 19 extend in a manner fully disclosed in said prior patent and now well understood in this art. It is pointed out that in FIGS. 1, 3 and 4, the reed valves have been omitted from the illustration for the sake of clarity in the drawings, but it will be understood that the reed valves are employed in the manner above referred to.

The intake passage or duct 14 in which the reed cage is positioned also extends upstream of the reed cage within the wall structure 20 which, in turn, is connected with the duct 21 which, in a typical case, is extended to a carburetor for delivery of the desired fuel/air mixture to the engine.

As seen in the drawings, the various parts of the fuel intake system are connected with the upper portion of the engine housing structure 5; and it will be observed that a frame element 22 is positioned between the wall 20 and the mounting flange 23 of the reed cage. These parts may be connected together as by means of bolts 24.

From the foregoing description and the drawings, it will be seen that the cross-sectional flow area in the intake tract and passage varies considerably from the duct 21 through the connector 20 and the reed valve cage 15. This is particularly true as the flow path enters and traverses the reed valve cage. As above pointed out, this has a tendency to alter the velocity of flow, the flow being retarded in the zones of large cross-sectional area and being accelerated in the zones of the smaller cross-sectional area.

It will also be seen that in addition to the variation in cross-sectional flow area of the intake passage, the entrance to the reed cage is characterized by a dimension in one direction (paralleling the reed cage apex 16) which is approximately two times the dimension in the other direction (i.e., in a direction perpendicular to the reed cage apex 16). In the absence of employment of an element within the intake passage as contemplated by the present invention, the dimensional relationships just referred to have a tendency to concentrate the flow in the central region of the reed cage and greatly reduce the flow adjacent to the boundaries of the flow passage at the ends of the reed cage.

With the foregoing in mind, the present invention contemplates the use of special forms of streamlined or aeroform devices, a device of this kind being generally indicated by the reference numeral 25 in FIGS. 1 to 4. It will be seen that this element in the central upstream region is of relatively large cross section, whereas the downstream or trailing edge or end portions of the element are of reduced cross-sectional area. The element has laterally extending portions 26—26 lying in a plane containing the axis of flow and also containing the axis of the apex element 16 of the reed cage. In addition, the element has upwardly and downwardly projecting portions 27—27 lying in a plane perpendicular to the plane just referred to and containing the flow axis but being perpendicular to the axis of the reed cage apex 16. These portions of the element 25 also have a flange 28 extended around the portions 27—27, the flange being proportioned and angled so that when the element is mounted in the flow passage in the manner illustrated, the edges of the flanges 28 are positioned close to the inner surfaces of the converging side walls of the reed cage 15.

As above pointed out, each inclined wall of the reed cage desirably has a plurality of laterally spaced valve ports, four being shown in the embodiment illustrated. The projecting flange 28 is positioned so that the flange will lie closely adjacent to one of the bridges between adjacent laterally spaced valve ports in each of the side walls of the reed cage in the central region of the reed cage. From FIGS. 2 and 3, it will be seen that the flange 28 projects into the V-shaped interior of the reed cage to a zone near the central apex member 16; and this arrangement aids in assuring uniformity of flow through the valve ports arranged at the opposite sides of the centrally positioned flange 28.

The aeroform shape of the portions 26—26 and 27—27 is highly effective in reducing velocity fluctuations in the flow path, particularly in the region of entrance into the reed cage. Since the fluctuations in the velocity of the fuel/air mixture are greatly reduced, it becomes practical to deliver larger quantities of fuel into the engine, particularly when the engine is operating at high speeds.

The employment of the streamlined element 25 having portions of streamlined shape in each of two right angle planes further enhances the reduction of velocity fluctuations, particularly in the region of the valve ports.

For purposes of mounting and support of the element 25, small mounting posts 29 are provided at the top and bottom of the portions 27—27; and these posts in the embodiment shown in the drawings are connected with the frame 22. The mounting posts 29—29 for the element may alternatively be connected with other parts of the engine intake structure.

In connection with the effect of employment of the element 25, it should futher be noted that this element is not only effective in reducing the upstream/downstream variation in the cross-sectional area of the flow path, but in addition, the arrangement of the element, including the mounting posts, is arranged so as to minimize blockage of flow at the boundaries of the flow passage entering the reed cage, particularly those boundaries which lie at the remote ends of the reed cage. In other words, the primary bulk or volume of the element 25 is centrally located i.e., is located in the center portion of the flow area in which (in the absence of the element 25) the flow would be concentrated. This further enhances the equalization or distribution of the fuel/air flow to all of the valve ports in the reed cage. In consequence, more efficient overall fuel/air feed is provided, with resultant improvement in the operating characteristics and particularly in the power of the engine at high operating speeds.

Although the streamlined element 25 of the present invention may be used in association with a variety of valve and engine arrangements, such a streamlined element is highly effective in an arrangement such as shown in the drawings, having supplemental intake passages 30—30 (see FIG. 3) which are connected with the intake tract downstream of the reed valve cage. These supplemental passages 30—30 and the associated ports communicate with the space below the piston. The housing structure 5-6 is preferably recessed in the region outside of the cylinder liner 7 and below the intake port 13, as is indicated at 31 in FIGS. 2 and 3, thereby providing a fuel supply passage toward each side of the cylinder; and the piston skirt is desirably cut away at the adjacent side so that the supplemental intake passages are continuously open throughout the entire cycle of operation of the engine.

By virtue of the form of the streamlined element 25 employed, including its cooperation with the interior of the V-shaped reed cage, uniformity of fuel/air intake through all of the valve ports is assured; and this provides substantially uniform flow not only through the principal intake port 13, but also through the supplemental intake passages 30—30, one of which is positioned toward each side of the cylinder.

In the embodiments of the engine illustrated in the drawings, it will also be seen that at least one auxiliary transfer port is also provided, this being indicated at 32 in FIG. 2, the auxiliary transfer port having communication with the space below the piston through the intake channel and the passage 31 and through the supplemental intake passages 30—30.

The embodiment described above and illustrated in FIGS. 1 to 4 inclusive is particularly effective for use in an engine in which the side walls of the reed cage are each provided with a multiplicity of valve ports, four such ports being frequently employed in an installation of this type. With the contoured element positioned in the intake passage upstream of the reed valve cage, configured to have a central portion or fin such as indicated at 28 extended into the reed cage, the streamlined or configured element not only serves the important function above described of decreasing the variation in the cross-sectional flow area of the flow passage, thereby minimizing inertia losses resulting from fluctuations in velocity of flow; but in addition, this arrangement further has the advantage of substantially dividing the flow into two portions, each of which is directed to those valve ports which lie at one side or the other of the central plane. This aids in dividing the flow into portions directed toward the two opposite ends of the reed cage. In turn, this aids in assuring adequate flow not only to the primary inlet port 13 in the side wall of the cylinder but also to the supplemental intake passages 30—30, one of which is extended toward each side of the cylinder.

With further reference to the arrangement of the invention as employed in an embodiment such as shown in FIGS. 1 to 4 having supplemental passages 30, one arranged toward each side of the intake area, it is to be noted that the disposition of the streamlined element in the intake passage in the central region thereof, without blockage of the side area adjacent the boundary walls at the ends of the reed cage, is important in order to increase the input through the supplemental passages. The supplemental passages have the inlet openings in the region of the ends of the reed cage.

Turning now to the embodiment illustrated in FIGS. 5 to 8, it is first pointed out that the engine structure illustrated is in many respects very similar to the engine structure of FIGS. 1 to 4, including the upper portion of the engine housing structure 5 and the lower portion 6, the cylinder liner 7, the piston 8, and the connecting rod 9. An exhaust port 10 is also provided, as well as the transfer port 11, the transfer port 11 being connected with the space below the piston by means of the transfer passage 12. The primary intake port in the cylinder wall is indicated at 13, this port being in communication with the intake passage 14. This general arrangement of these parts is essentially the same in both of the two embodiments illustrated in the drawings.

In the embodiment shown in FIGS. 5 to 8 inclusive, the valve arrangement and the contoured or aeroform element upstream of the valves is of different configuration and construction. In this embodiment, the reed cage 33 is provided with only a pair of valve ports on each of the two inclined sides of the cage, as indicated at 34. As in the first embodiment, the reed cage apex 35 is arranged horizontally; and each valve port 34 is provided with primary and secondary reed petals, these being somewhat diagrammatically indicated in FIG. 6 at 36 and 37. The reed valves or reed petals are preferably arranged and constructed in the manner more fully disclosed in my prior U.S. Pat. No. 3,905,341.

The reed cage 33 is provided with a mounting flange 38 adapted to be associated with the frame element 39. The frame 39 and the flange 38 and thus the reed cage are adapted to be secured in position by means of bolts 24a in the same general manner as described more fully above with reference to the bolts 24 which serve this purpose in the first embodiment described. The fuel supply duct 21 may be of the same construction as described above, as may also the wall structure 20 intervening between the fuel supply duct 21 and the frame 39 (see particularly FIGS. 6 and 7).

As in the first embodiment, it will be seen that the cross section of the flow area for the fuel and air mixture varies in different portions of the supply passage through the duct 21, the wall structure 20, the frame 39 and the interior of the reed cage 33. In the embodiment of FIGS. 5 to 8, the element provided for reducing the variation in the cross section of the flow passage takes a somewhat simplified form as compared with the element employed in FIGS. 1 to 4 inclusive. In the first place, the element (25) employed for this purpose in the first embodiment has a compound configuration, having projecting portions 26, 27 and 28 more fully described above, whereas, the element employed in the embodiment of FIGS. 5 to 8 is more simply shaped and constructed. Indeed, the element of the embodiment of FIGS. 5 to 8 may readily be formed from a piece of a metal bar of rectangular shape. This element in the second embodiment is generally indicated by the reference numeral 40 and extends vertically between the upper and lower parts of the frame 39, as clearly appears in FIGS. 5, 6 and 8. Posts 41 at the upper and lower ends of this element serve to mount the element within the frame 39.

As above noted, the element 40 may readily be constructed from a bar of rectangular cross section, as will readily be understood from examination of FIGS. 5 and 7. The leading edge of this bar is preferably machined to a rounded contour as indicated at 42; and the trailing edge of the bar is preferably machined to a tapered configuration indicated at 43 in FIGS. 5 and 7. This trailing edge portion of the element is also cut away at its upper and lower edges as seen at 44. The angle of these cut-away edges is preferably such as to closely fit the inside of the inclined reed cage walls, thereby dividing the interior of the reed cage into two portions, one lying toward one end of the cage and the other toward the other end. This is effective in dividing the flow into two portions, one of which is associated with the reed cage valve ports toward each end of the reed cage.

From FIGS. 5 and 7, it will readily be appreciated that the contoured element of this second embodiment is, in general, of aeroform shape but, at the same time, can readily be machined from a piece of a single rectangular metal bar. The fabrication of the element 40 from a section of a metallic bar also simplifies the provision of the mounting studs such as indicated at 41, which may also merely be comprised of additionally machined parts of the piece of the metal bar employed.

As in the embodiment of FIGS. 1 to 4 inclusive, the embodiment of FIGS. 5 to 8 inclusive is also characterized by location of the element in the flow path in the central region of the flow path, thereby achieving the desirable effect mentioned above in connection with the first embodiment, namely, diversion of flow from the central region of the flow path to the boundary surfaces. As already mentioned, this aids in increasing the effectiveness of the fuel/air flow in regions which would otherwise be relatively inactive. Note also that in the embodiment of FIGS. 5 to 8, as in the first embodiment, the mounting studs are located in a plane at right angles to the apex of the reed cage and containing the axis of the flow path. This is of importance in minimizing obstruction of the flow path adjacent to the boundaries which are most remote from the central region.

Turning now to the embodiment shown in FIGS. 9 to 13c, it is first pointed out that the V-shaped reed cage of this embodiment has inclined walls 45 projecting from the mounting frame 46, the two inclined walls being interconnected by the reed cage apex member 47. The reed cage also has end walls 48; and from FIG. 9, it will be seen that each of the inclined walls 45 is provided with three valve ports 49. It will be understood that reed valves of the kind hereinabove referred to will be mounted upon the inclined walls of the reed cage, but the illustration of these has been omitted from most of the figures for the sake of simplicity.

As in the preceding embodiments, the flow diverting element arranged in the flow path is mounted by means of a frame 50. The flow diverting element in this form has a configuration which is, in general, streamlined with respect to the upstream and downstream portions or edges of the element, but the shape of the element itself is especially arranged and adapted to cooperate with a reed cage having an odd number (for instance, three) of valve ports on each of the inclined sides of the reed cage. Having in mind the known fundamental with respect to the action of gas flow in a flow passage according to which the flow tends to become concentrated in the central region and to become progressively diminished as the boundary walls are approached, the flow diverting element is positioned in this embodiment in alignment with the central valve ports of the reed cage, while leaving the outer or side ports substantially unobstructed. By arrangement of the flow diverting element in this manner, some of the fuel/air flow is diverted from the central region into the lateral or side wall regions, for instance, the regions adjacent the end walls 48 of the reed cage and, therefore, caused to flow through the ports 49 adjacent to the end walls 48.

This extensively modifies the flow pattern and improves the overall fuel/air input because the outer ports 49 become much more effective than they would be in the absence of the flow diverting element.

As in the first and second embodiments, the flow diverting element in the embodiment of FIGS. 9 to 13c is also mounted by mounting means connected with the upper and lower portions of the frame 50, rather than with the lateral or upright portions of the frame, thereby further diminishing interference with the flow into and through the laterally spaced valve ports 49.

The special form or shape of the flow diverting element of this third embodiment appears from various different aspects in FIGS. 9, 10, 11 and 12; and the cross-sectional shape of the element is indicated in the sectional views 13a, 13b and 13c. With regard to this special shape, it is first pointed out that the element is mounted in the frame 50, for instance, by means of studs 51 (see particularly FIG. 13a) which, if desired, may be received in apertures formed in the frame 50 but which, in any event, are preferably welded or soldered to the upper and lower sides of the frame 50, as indicated at 52 in FIGS. 10, 11 and 12.

As will be seen from comparison of the sectional FIGS. 13a, 13b and 13c with the other figures, notably FIG. 12, the forward or leading edge portion 53 of the flow diverting element is relatively thick as compared with the trailing edge portion 54 thereof. FIG. 13b indicates the transition between the thickest portion (FIG. 13a) toward the leading edge and the thinnest portion (FIG. 13c) toward the trailing edge. It will be seen that a portion of the trailing edge 54 extends generally in a direction substantially paralleling the reed cage apex; and since this portion of the element projects into the reed cage, the arrangement of the edge 54, generally paralleling the reed cage apex, will accomplish the flow diverting purposes but will do so without substantial blockage of the flow path into the central ports in the reed cage walls.

In addition to the progressive diminution in the thickness of the element from the leading edge to the trailing edge, the trailing edge portion is also preferably inclined with respect to the horizontal at an increasing angle, as will be apparent from various of the figures, particularly FIGS. 10, 13a, 13b and 13c.

The configuration above referred to is highly effective not only in providing for some equalization of the fluctuation in the cross-sectional area of the flow path from the upstream region to the downstream region thereof, but also in compensating for the tendency for the flow to diminish toward the boundary walls of the flow passage, and thereby increase the total input of the fuel/air mixture at all engine speeds. This also tends to make more effective use of the available cross-sectional flow area of the valve ports in the side walls of the valve cage.

It will be understood that the contoured element of any of the embodiments illustrated in the drawings may be mounted in various different ways. The employment of a separate mounting frame (such as shown at 22 in FIG. 1, at 39 in FIG. 5 and at 50 in FIG. 9) represents one convenient way, but such an element may also be mounted in other ways, even directly in the structure or mounting flange of the reed cage.

I claim:

1. An internal combustion engine having a fuel/air supply passage, reed valve means in the supply passage comprising a wall in the path of flow in the supply passage, said wall having laterally separated valve ports, separate reed valves downstream of said wall and positioned to overlie and cooperate with the valve ports, and an element positioned in the flow passage upstream of said wall, said element being of aeroform shape, with a leading edge portion presented upstream of the direction of flow in the supply passage, and said element having a trailing edge portion lying in a plane between said laterally separated valve ports and containing the flow axis in the supply passage, said trailing edge portion having an edge adjacent to the wall between said laterally separated valve ports.

2. An internal combustion engine as defined in claim 1 and further including means for mounting said element in the fuel/air supply passage, the mounting means being connected with said element substantially in the plane of said trailing edge portion.

3. An internal combustion engine having a fuel/air supply passage, reed valve means in the supply passage comprising a wall in the path of flow in the supply passage, said wall having laterally separated valve ports, reed valves downstream of said wall and positioned to overlie and cooperate with the valve ports, an element positioned in the flow passage upstream of said wall, said element being of aeroform shape, with a leading edge portion presented upstream of the direction of flow in the supply passage, and means for mounting said element in the fuel/air supply passage, the mounting means being connected with said element and lying substantially in a plane between said laterally separated valve ports and containing the flow axis of the supply passage.

4. An internal combustion engine having a fuel/air supply passage, reed valve means in the supply passage comprising a V-shaped reed cage with its apex presented downstream of the direction of flow through the supply passage, the reed cage having converging side walls with valve ports therein, reed valves overlying the valve ports on the downstream sides of the reed cage walls, and an element of aeroform cross-sectional shape positioned in the flow passage upstream of the reed cage walls, and having portions of larger and smaller cross section with the portion of larger cross section positioned upstream of the portion of smaller cross section, said element being of aeroform cross-sectional shape in a plurality of planes each containing the axis of the direction of flow through the supply passage, one of said planes containing the axis of the reed cage apex and the other plane being perpendicular to the axis of the reed cage apex.

5. An internal combustion engine as defined in claim 4 in which the portion of the element of smaller cross section is nested within the reed cage.

6. An internal combustion engine as defined in claim 4 and further including mounting means for said element connected therewith in a plane containing the axis of the direction of flow and perpendicular to the axis of the reed cage apex.

7. An internal combustion engine including engine housing structure having a cylinder with a piston reciprocable in the cylinder between bottom and top dead center positions, a primary intake port through the cylinder wall, a fuel/air supply passage communicating with said intake port, reed valve means in the supply passage comprising a wall in the path of flow in the supply passage to the intake port, said wall having laterally separated valve ports, reed valves downstream of said wall and positioned to overlie and cooperate with the valve ports, laterally spaced supplemental flow passages in the engine housing structure, one to the left and one to the right of the primary intake port and connecting the supply passage downstream of the reed valves with the space below the piston in bottom dead center position, and an element positioned in the flow passage upstream of said wall, said element being of aeroform shape, with a leading edge portion presented upstream of the direction of flow in the supply passage, and said element having a trailing edge portion lying in a plane between said laterally separated valve ports and containing the flow axis in the supply passage, the trailing edge portion being positioned in a plane between the laterally spaced supplemental flow passages and having an edge adjacent to the wall between said laterally separated valve ports.

8. An internal combustion engine including engine housing structure having a cylinder with a piston reciprocable in the cylinder between bottom and top dead center positions, a primary intake port through the cylinder wall, a fuel/air supply passage communicating with said intake port, reed valve means in the supply passage comprising a wall in the path of flow in the supply passage to the intake port, said wall having laterally separated valve ports, reed valves downstream of said wall and positioned to overlie and cooperate with the valve ports, laterally spaced supplemental flow passages in the engine housing structure, one to the left and one to the right of the primary intake port and connecting the supply passage downstream of the reed valves with the space below the piston in botton dead center position, and means positioned in the flow passage upstream of said wall, said means laterally dividing the flow path into portions respectively directed toward said laterally spaced supplemental flow passages.

9. An internal combustion engine as defined in claim 8 in which said means positioned in the flow passage upstream of said wall is of aeroform shape with leading and trailing portions respectively of greater and lesser cross-sectional dimension.

10. An internal combustion engine as defined in claim 8 in which said means positoned in the flow passage upstream of said wall is of aeroform shape with leading and trailing portions respectively of greater and lesser cross-sectional dimension, said trailing portion having an edge positioned close to the wall of the reed valve means in a plane in a region between said laterally separated valve ports.

11. An internal combustion engine as defined in claim 8 in which a plurality of valve ports and cooperating reed valves are provided at each side of the central plane of the reed valve means, and in which the means laterally dividing the flow path is centered substantially in said central plane.

12. An internal combustion engine as defined in claim 8 in which a pair of side-by-side valve ports and passages are provided, one at each side of the central plane of the reed valve means, and in which the means laterally dividing the flow path is centered in the region of said central plane.

13. An internal combustion engine having a fuel/air supply passage, reed valve means in the supply passage comprising a V-shaped reed cage with its apex presented downstream of the direction of flow through the supply passage, the reed cage having spaced end walls and diverging side walls each side wall having a plurality of valve ports therein, reed valves overlying the valve ports on the downstream sides of the reed cage side walls, and an element positioned in the flow passage upstream of the reed cage walls, said element being extended across the reed cage between the side walls in the central region between the end walls, and said element having a rounded leading edge presented upstream of the direction of flow through the fuel/air passage and further having a tapered trailing edge extended into a space between the converging side walls.

14. An internal combustion engine having a fuel/air supply passage, reed valve means in the supply passage comprising a V-shaped reed cage with its apex presented downstream of the direction of flow through the supply passage, the reed cage having spaced end walls and diverging side walls each side wall having a plurality of valve ports therein, reed valves overlying the valve ports on the downstream sides of the reed cage side walls, and an element positioned in the flow path upstream of the reed cage, said element having a first dimension in a direction paralleling the reed cage apex, which first dimension is substantially less than the distance between the spaced end walls of the reed cage, said element having a second dimension in a plane perpendicular to the reed cage apex, which second dimension approximates the dimension between the outer edges of the diverging side walls of the reed cage apex and a downstream edge portion of said element projects into the space between the diverging side walls of the reed cage.

15. An internal combustion engine as defined in claim 14 in which the downstream edge portion of said element is tapered to a thin terminal edge.

16. An internal combustion engine as defined in claim 14 and further including mounting means for said element, the mounting means being connected with the element in said plane perpendicular to the reed cage apex.

17. An internal combustion engine having a fuel/air supply passage, reed valve means in the supply passage comprising a V-shaped reed cage with its apex presented downstream of the direction of flow through the supply passage, the reed cage having converging side walls, each with a plurality of valve ports therein, reed valves overlying the valve ports on the downstream sides of the reed cage walls, and a flow diverting element in the flow passage upstream of the reed cage walls, said element being positioned in the central region of the flow passage between the end walls of the reed cage and providing for diversion of the flow from the central region to the regions adjacent the boundary walls of the flow passage at opposite ends of the reed cage.

18. An internal combustion engine having a fuel/air supply passage, reed valve means in the supply passage comprising a V-shaped reed cage with its apex presented downstream of the direction of flow through the supply passage, the reed cage having converging side walls and having end walls spaced from each other in a direction paralleling the reed cage apex a distance greater than the dimension transversely of the apex, each side wall having a plurality of valve ports on the downstream sides of the reed cage walls, a flow diverting element in the flow passage upstream of the reed cage walls, said element being positioned in the central region of the flow passage between the end walls of the cage and providing for diversion of the flow from the central region to the regions adjacent the end walls of the reed cage, and mounting means for said element positioned and connected with the element in a plane containing the flow axis of the supply passage and extended transverse to the reed cage apex.

19. An internal combustion engine having a fuel/air supply passage, reed valve means in the supply passage comprising a wall in the path of flow in the supply passage, said wall having a plurality of valve ports, reed valves downstream of said wall and positioned to overlie and cooperate with the valve ports, an element positioned in the flow passage upstream of said wall, said element being of aeroform shape, with a leading edge portion presented upstream of the direction of flow in the supply passage, and means for mounting said element in the fuel/air supply passage, the mounting means being connected with said element and extended therefrom in a plane perpendicular to said wall and containing the flow axis of the supply passage.

20. An internal combustion engine having a fuel/air supply passage, reed valve means in the supply passage comprising a V-shaped reed cage with its apex presented downstream of the direction of flow through the supply passage, the reed cage having converging side walls and having end walls spaced from each other in a direction paralleling the reed cage apex, each side wall having three valve ports on the downstream sides of the reed cage walls, a flow diverting element in the flow passage upstream of the reed cage walls, said element being positioned in the central region of the flow passage and providing for diversion of the flow from the region of the central valve ports to the regions of the outer valve ports.

21. An internal combustion engine as defined in claim 20 in which the flow diverting element is laterally inclined at an oblique angle to the planes of the end walls of the reed cage.

22. An internal combustion engine having a fuel/air supply passage, reed valve means in the supply passage including a ported wall having reed valves associated with the wall ports, the supply passage in the region upstream of the ported wall having boundary walls defining a flow passage having a cross-sectional dimension in a first direction greater than the cross-sectional dimension in a second direction perpendicular to said first direction, and a flow diverting element in the flow passage upstream of the ported wall, the element being located in spaced relation to the boundary walls defining the larger cross-sectional dimension and providing for diversion of the flow toward at least one of the walls defining said larger dimension.

* * * * *